United States Patent
Teung et al.

(10) Patent No.: US 6,945,638 B2
(45) Date of Patent: Sep. 20, 2005

(54) METHOD AND SYSTEM FOR CONTROLLING THE TEMPERATURE OF A DISPENSED LIQUID

(75) Inventors: Patrick Teung, Campbell, CA (US); Michael J. Cima, Winchester, MA (US); Timothy J. Pryor, Yardley, PA (US); Peter A. Materna, Metuchen, NJ (US)

(73) Assignees: Therics, Inc., Princeton, NJ (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/284,425

(22) Filed: Oct. 29, 2002

(65) Prior Publication Data

US 2003/0128267 A1 Jul. 10, 2003

Related U.S. Application Data

(60) Provisional application No. 60/338,624, filed on Oct. 29, 2001.

(51) Int. Cl.$^7$ .................................................. B41J 2/07
(52) U.S. Cl. ........................................................ 347/74
(58) Field of Search ............................... 347/74, 56, 75, 347/54, 81; 204/666

(56) References Cited

U.S. PATENT DOCUMENTS

| 4,459,469 A | 7/1984 | Ishima | 219/497 |
| 4,723,129 A * | 2/1988 | Endo et al. | 347/56 |
| 4,780,532 A | 10/1988 | Baxter et al. | 534/701 |
| 5,622,897 A | 4/1997 | Hayes | 438/21 |
| 5,810,988 A * | 9/1998 | Smith et al. | 204/666 |
| 2002/0084290 A1 | 7/2002 | Materna | 222/420 |

FOREIGN PATENT DOCUMENTS

| EP | 0700790 A2 | 3/1996 |
| EP | 0715960 A2 | 6/1996 |
| EP | 1095771 A2 | 5/2001 |
| GB | 1284939 | 8/1972 |
| JP | 02-281958 | 11/1990 |

* cited by examiner

Primary Examiner—K. Feggins
(74) Attorney, Agent, or Firm—Hunton & Williams LLP

(57) ABSTRACT

A device for controlling or altering the temperature of a liquid at the point of dispensing. A temperature-altering device is thermally coupled to a dispensing device to compensate for heat dissipated into the liquid as it passes through the dispensing device during dispensing. The dispensing device may be for example, a miniature solenoid valve (microvalve), a piezoelectric printhead, or the like. According to aspects of the invention, a temperature-altering device provides or reduces heat at the point of dispensing in order to alter, control or maintain a constant temperature of the dispensed liquid. As a result, improvement is obtained in the consistency of the fluid regime of the dispensed droplet stream. The temperature-altering device may be a thermoelectric device capable of moving heat either from or to the dispensing structure, or may be a heater. This device may be used beneficially even when the dispensing is performed near room temperature and the liquid does not require heating to maintain its liquid state.

56 Claims, 11 Drawing Sheets

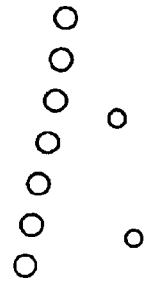
*FIG. 2A*  *FIG. 2B*  *FIG. 2C*
(Prior Art)  (Prior Art)  (Prior Art)
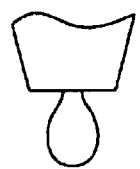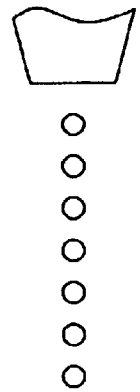
*FIG. 2D*  *FIG. 2E*
(Prior Art)  (Prior Art)

METHOD AND SYSTEM FOR CONTROLLING THE TEMPERATURE OF A DISPENSED LIQUID

This application claims benefit of U.S. Provisional Application 60/338,624 filed Oct. 29, 2001.

BACKGROUND OF THE INVENTION

1. Field of the Invention

This invention relates generally to dispersing liquids from a printhead, and more particularly, to controlling the temperature of a dispensed liquid at the point of discharge.

2. Description of the Related Art

Dispensing and printing of small quantities of liquids have been done by any of several methods including miniature solenoid valves (microvalves), piezoelectric printheads, continuous-jet printheads, and bubble-jet printheads. In all of these, variable temperature of the dispensed liquid negatively impacted the quality and consistency of the droplet. Precise temperature control of the printed liquid has not been adequately controlled, in part because traditional liquids and applications did not require it. Currently, however, the need to print liquids with greater temperature sensitivity, as well as more sophisticated printing applications, requires more precise control. For example, fluids used in three-dimensional printing can include fluids that are more viscous than or are at the viscosity range of typical ink-jet inks. Also, the viscosity versus temperature slope can be steeper for fluids used in three-dimensional printing. The result of this steeper slope was that even small shifts in temperature resulted in significant shifts in viscosity making it much more difficult to maintain a consistent flow pattern during dispensing.

Further, liquids heated to above ambient temperature were severely impacted by temperature variation because these substances may not be liquid at ambient temperature. Examples of heated liquids include waxy inks, other waxy substances, and solder. For use with hot-melt inks, tank heaters have been used to maintain a melted reservoir of the solder or wax, however, fluctuation in temperature at the point of dispensing continued to negatively impact print quality.

Most commonly in the past, inks, binder liquids and similar liquids have been dispensed at approximately ambient temperature, in the range of 20 to 25° C. However, solenoid valves or microvalves dissipate heat from an internal coil which is powered by an electrical waveform, thus impacting the quality of the printing. Previously, attempts have been made to control the average temperature or external surface temperature of the microvalve body through appropriate thermal management of this heat. Passive thermal management included potting the interior valve region containing the coil with a thermally conductive material to improve heat transfer. Additionally, heat sinks such as fins were used external to the valve. Active temperature control of the block or heat sink where the microvalve was mounted previously included a temperature sensor and a controller. However, in either previously used passive or active temperature control means, there was still some unavoidable and unacceptable temperature rise of the valve coil and variable heat dissipation, causing increased liquid temperature due to these temperature increases. For precise dispensing of fluids, these variations are unacceptable due to the negative impact on the flow pattern of the printed liquid.

FIG. 1 illustrates the heat transfer with conventional microvalve usage. Heat generated inside the valve flowed either outward to the surface of the valve body, labeled Heat Path A, or inward to the liquid passing through the valve, labeled Heat Path B. Typically some combination of heat transfer paths occurred. For example, in the operation of microvalves without temperature control, the external surface temperature of the valve can increase to as much as 15° C. above ambient temperature during steady-state operation. Measured increase in the temperature of the dispensed liquid verifies heat transfer along Heat Path A. Furthermore, the amount of heat transfer from the solenoid into the dispensed liquid was variable depending on the operating history of the microvalve, ambient conditions, duration of operation, and other factors.

Heat from the valve increased the temperature of the dispensed liquid, which then altered the fluid viscosity. Changes in fluid viscosity result in unpredictable shifts to the stream flow regime among the various patterns shown hereinafter. Thus, the techniques described so far for managing the overall temperature of the microvalve body, for example, heat sinks for the microvalve body or control of the surface temperature of the microvalve body, have not completely eliminated inconsistencies and variations of quality of dispensing and printing that are related to temperature variation.

FIGS. 2A–2E illustrate various flow phenomena that can occur during dispensing of droplets. It has been found that changes from an acceptable stream to an unacceptable stream pattern can occur somewhat unpredictably. As noted above, one reason for unpredictable shifts to the stream flow has been due to random variation of the liquid temperature at the point of dispensing, hence the need to more precisely control the temperature of the dispersed liquid is needed.

The valve dispenses in a sequence of many consecutive actuations, typically at 800 Hz, using microvalves and fluid as described herein. Droplet phenomena observed in such dispensing by prior art techniques have been classified into at least the following distinct formations.

Satellites

As illustrated in FIG. 2A, satellite droplets occur when one valve actuation results in more than one produced drop. In such a case, frequently there are two drops produced for each commanded valve actuation, with one of the drops being significantly smaller than the other. In FIG. 2A, there are two similarly sized drops per valve actuation.

Deviations

As illustrated in FIG. 2B, a stream deviation is when a stream of uniform droplets issues from the nozzle but issues in a direction different from the principal axis of the nozzle. Stream deviation often results from a drop of liquid existing on the surface of the nozzle somewhere near the orifice. A stream deviation often appears randomly, but once established, the stream's direction tends to remain consistently off-center. FIG. 2B shows a droplet stream which is deviating to the left.

Stream Splitting

FIG. 2C shows a combination of satellites and stream deviation.

The satellites are much smaller than the main stream and are veering off to the right. The main stream itself has a slight deviation to the left. Stream splitting situations often involve satellite streams with very small diameter droplets. These satellite streams are highly susceptible to air currents and often change their direction.

Drip mode

As illustrated in FIG. 2D, drip mode is a situation in which the nozzle no longer produces a droplet stream.

Instead, fluid from many valve actuations accumulates at the nozzle surface in the form of a large drop, and occasionally that very large drop detaches and falls to the print surface. It has been observed that flow, which was in one of the other modes, can transition into drip mode suddenly and without warning.

Acceptable Stream

FIG. 2E illustrates one embodiment of an acceptable droplet stream. The droplet spacing is uniform and constant and no satellites or deviations are present.

The streams in FIGS. 2A, 2B, and 2C would cause dispensing difficulties in various precision applications, for example, three-dimensional printing, because of uneven distribution of binder liquid on the powder bed. Printing with such a stream would yield three-dimensionally printed parts with poor surface finish, poor dimensional control, and poor control of internal microstructure. Drip mode, which is shown in FIG. 2D, would introduce major errors into printed parts, often resulting in the need to discard an entire part being printed.

In addition to temperature variations causing shifts from one flow regime to another, having major and dramatic unacceptable effects on the printed part, it has been found that even if the flow remains within the desirable flow regime, there can be significant changes in the drop velocity due to temperature changes. Drop velocity is important in various precise applications of printing, for example, three-dimensional printing, because placement of drops depends in part on the time of flight of drops from the nozzle to the powder bed. Consistent drop velocity is important in obtaining equidistantly spaced droplets. If the time of flight inadvertently varies during a print job, the dimensions and surface quality of the printed parts are negatively impacted.

FIGS. 3A–3D illustrate one example of a microvalve dispensing a continuous stream of drops over time. FIGS. 3–3D illustrate that even when controllable parameters, including flow rate, are kept constant, droplet velocity may be variable for temperature sensitive materials due to variations in the dispensed liquid's temperature. During the dispensing duration illustrated in FIG. 3, pressure inputs and electrical inputs were held constant, the valve body temperature was controlled as is known in the prior art, but the temperature of the dispensing structure or the nozzle was not controlled.

FIGS. 3A–3D illustrate the results of actual photographed dispensing patterns. FIG. 3A illustrated the initial desired dispensing droplet rate of 1.22 m/s and measured flow rate of 0.49 gms/min at time zero. FIG. 3B illustrates the resulting inadvertent increased dispensing rate of 0.77 m/s and measured flowrate of 0.52 gms/min at 45 minutes. FIG. 3C illustrated the resulting inadvertent additional increased dispensing rate of 0.33 m/s and measured flow rate of 0.53 gms/min at 90 minutes. As shown, the drop velocity unacceptably changed quite noticeably over time until at 90 minutes, the dispensing pattern changed to drip mode illustrated in FIG. 3D, and thus effectively ceased dispensing. These large fractional changes in drop velocity resulted in variable and unpredictable placement of the dispensed drops due to flight time variation. As noted, separate measurements indicate that in this experiment, there were not significant variations in flowrate, only in drop velocity. All of the illustrations of dispensing patterns in FIGS. 2A–2E and 3A–3D represent photographs from experiments having temperature control only applied to the body of the microvalve in accordance with prior art practice.

As illustrated in FIGS. 2–2E and 3–3D, varying liquid temperature at the point of dispensing the liquid negatively impacts the consistency, repeatability, and quality of the droplet size; as well as drop velocity, spacing, and positioning.

BRIEF SUMMARY OF THE INVENTION

The present invention provides a new method and system for controlling the temperature of a dispensed liquid at the point of dispensing. One embodiment of the present invention includes a dispensing device such as a microvalve that introduces additional heat to the system through operation combined with a control to reduce the temperature of the liquid at the point of dispensing. Another embodiment of the present invention includes a liquid that requires dispensing above ambient temperature and a control at the point of dispensing for increasing the temperature of the liquid to a constant elevated temperature. In accordance with aspects of the present invention, it is possible to either increase or decrease the temperature at the point of dispensing, as needed.

BRIEF DESCRIPTION OF THE SEVERAL VIEWS OF THE DRAWINGS

FIGS. 2–2E are exemplary illustrations of droplet dispensing regimes according to prior art usage of microvalves.

DETAILED DESCRIPTION OF THE INVENTION

A temperature control system, and in particular, a system and corresponding method for controlling the temperature of a dispensed liquid, is described in detail herein. In the following description, numerous specific details are provided, such as specific microvalve printhead configurations, piezoelectric dispensers, etc., to provide a thorough understanding of various embodiments of the invention. One skilled in the relevant art, however, will recognize that the invention can be practiced on various printhead dispenser configurations without one or more of the specific details, or configurations, methods, etc. In other instances, well-known structures or operations are not shown or not described in detail to avoid obscuring aspects of the invention.

Figure 1:
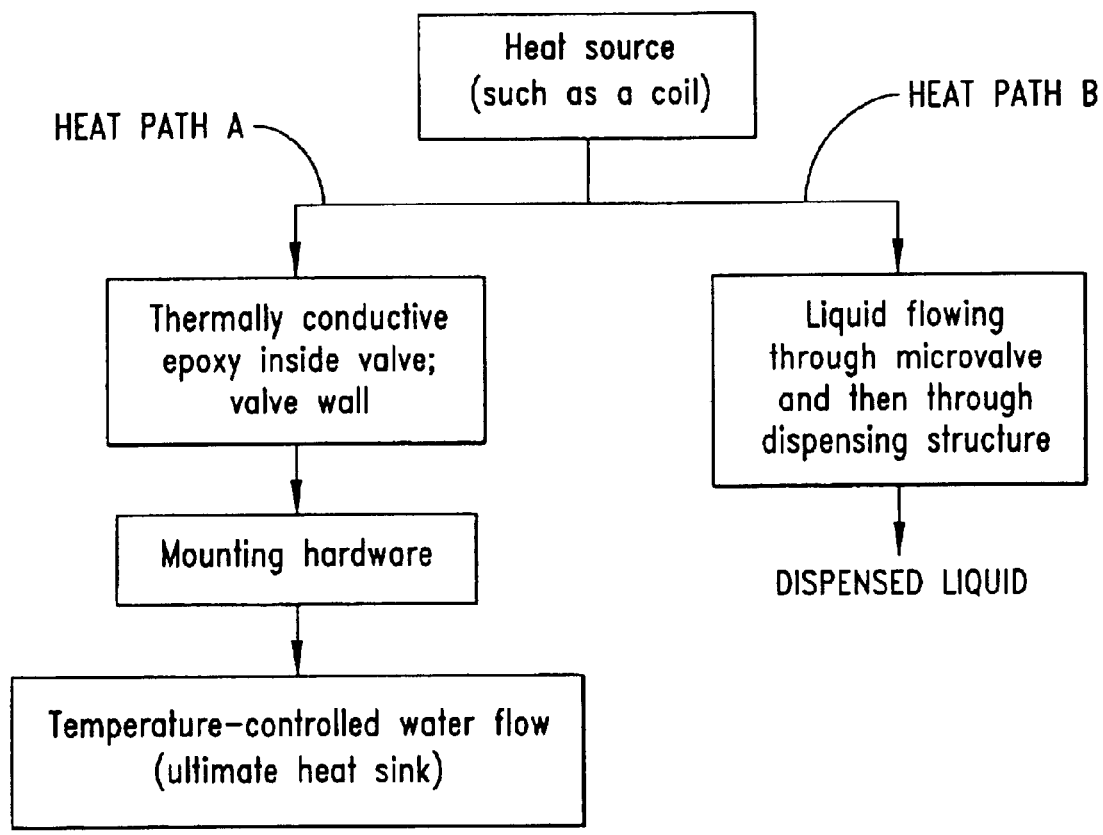
FIG. 1 is a flow chart illustrating paths of heat flow for a microvalve according to the prior art.
Figure 3D:
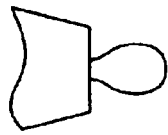
FIGS. 3–3D are exemplary illustrations of variations of drop velocity within a dispensing regime over time, according to prior art usage of microvalves.
Figure 3C:
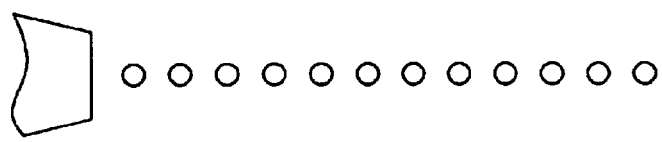
Figure 3B:
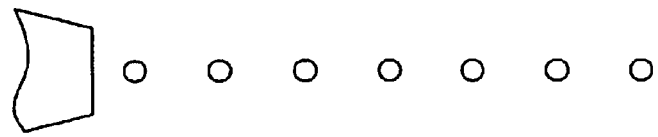
Figure 3A:
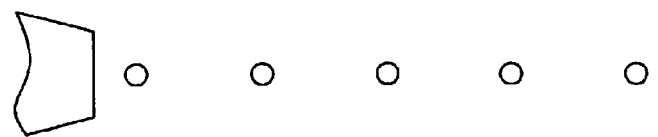
Figure 4:
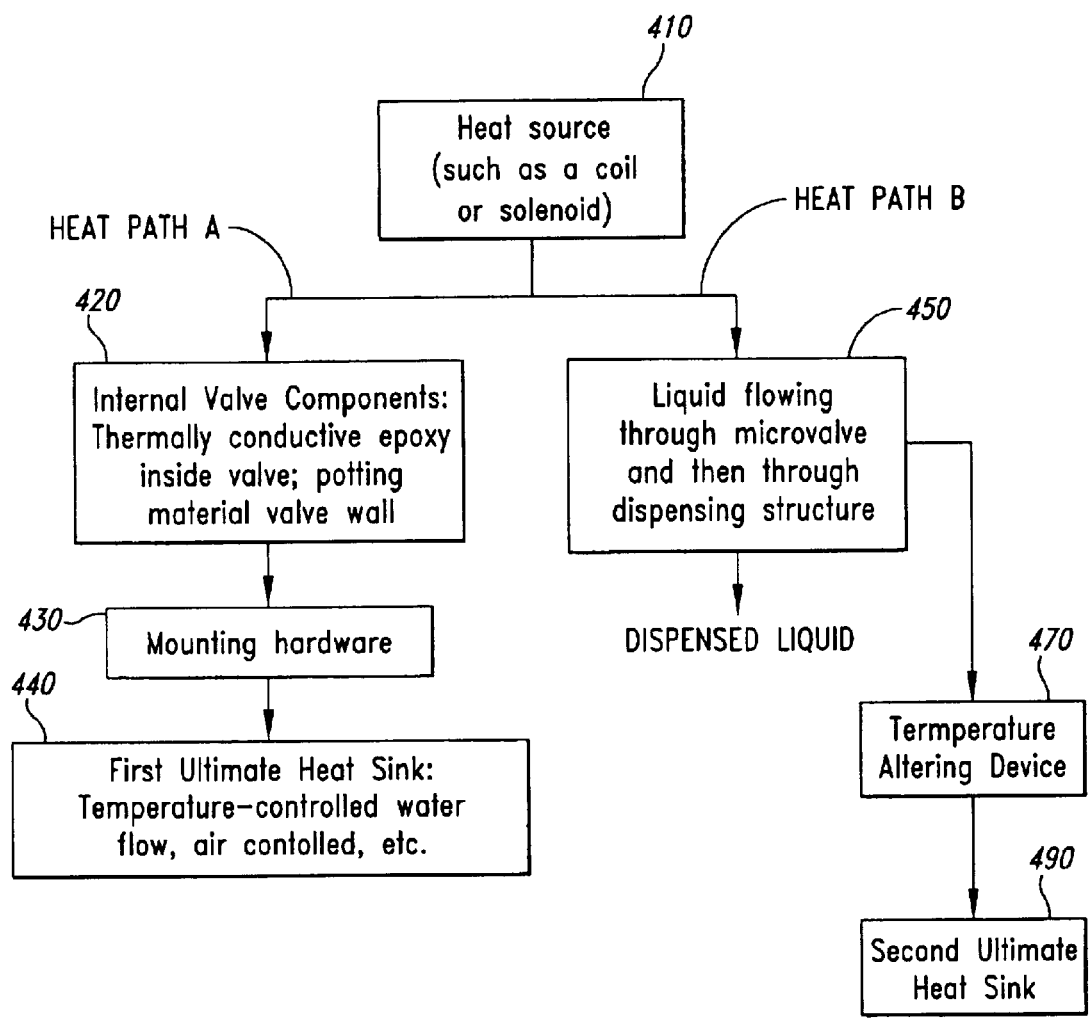
FIG. 4 is a flow chart illustrating a heat flow path for a microvalve in accordance with principles of the present invention.

Referring to the flowchart of FIG. 4, heat flow paths for a microvalve are illustrated in accordance with the present invention. A microvalve contains a heat source component such as solenoid 410 which generates heat. This heat dissipates in two directions. Heat Path A illustrates heat flowing outward to the surface of the valve body. Heat along Heat Path A flows by conduction from the source of heat or the solenoid 410 through the internal components of the microvalve. These components may include thermally conductive potting material, through the microvalve wall, to the microvalve external surface. Heat may then be further transferred through mounting hardware 430 to an ultimate heat sink 440. The ultimate heat sink 440 may contain a flowing liquid whose temperature may be actively controlled. Alternatively, heat may ultimately be transferred to the air or simply to a large nearby solid component. Whatever heat is not transferred to the ultimate heat sink 480 by Heat Path A, is transferred by Heat Path B to the liquid that is being dispensed through the microvalve's dispensing structure 450.

After liquid flows through the microvalve, it flows through dispensing structure 450, which may comprise an orifice or nozzle or similar component as described below, prior to being dispensed. In accordance with aspects of the current invention, the temperature of dispensing structure 450 is further influenced by temperature-altering device 470 which provides Heat Path C.

According to one aspect of the invention, Heat Path C is created with temperature-altering device 470. The temperature-altering device 470 influences the temperature of the dispensing structure 450 by maintaining thermal contact with the dispensing structure 450 while having a temperature different from the temperature of dispensing structure 450. This causes heat to flow in general either from the dispensing structure 450 to the temperature-altering device 470 or from the temperature-altering device 470 to the dispensing structure 450, so as to alter the temperature of dispensing structure 450 and hence the temperature of the dispensed liquid at the point of dispensing. In one embodiment, temperature-altering device 470 and Heat Path C remove heat from the dispensing structure 450. Heat may then be transferred from temperature-altering device 470 to an ultimate heat sink 490. The temperature of the liquid leaving dispensing structure 450 may therefore be closely controlled to maintain the dispensed liquid at a constant value. Ultimate heat sink 490 is shown as being physically distinct from ultimate heat sink 440, although it does not have to be.

In yet another embodiment of the present invention, the temperature-altering device 470 could supply heat to dispensing structure 450, or could alternately remove heat from and supply heat to dispensing structure 450 as needed to maintain a constant temperature of the dispensed liquid. In yet another embodiment of the present invention, either independently or in addition to correcting temperature fluctuations from valve-dissipated heat, localized temperature control at the dispensing structure can correct random variations of ambient temperature, liquid supply temperature, etc.

Figure 5:
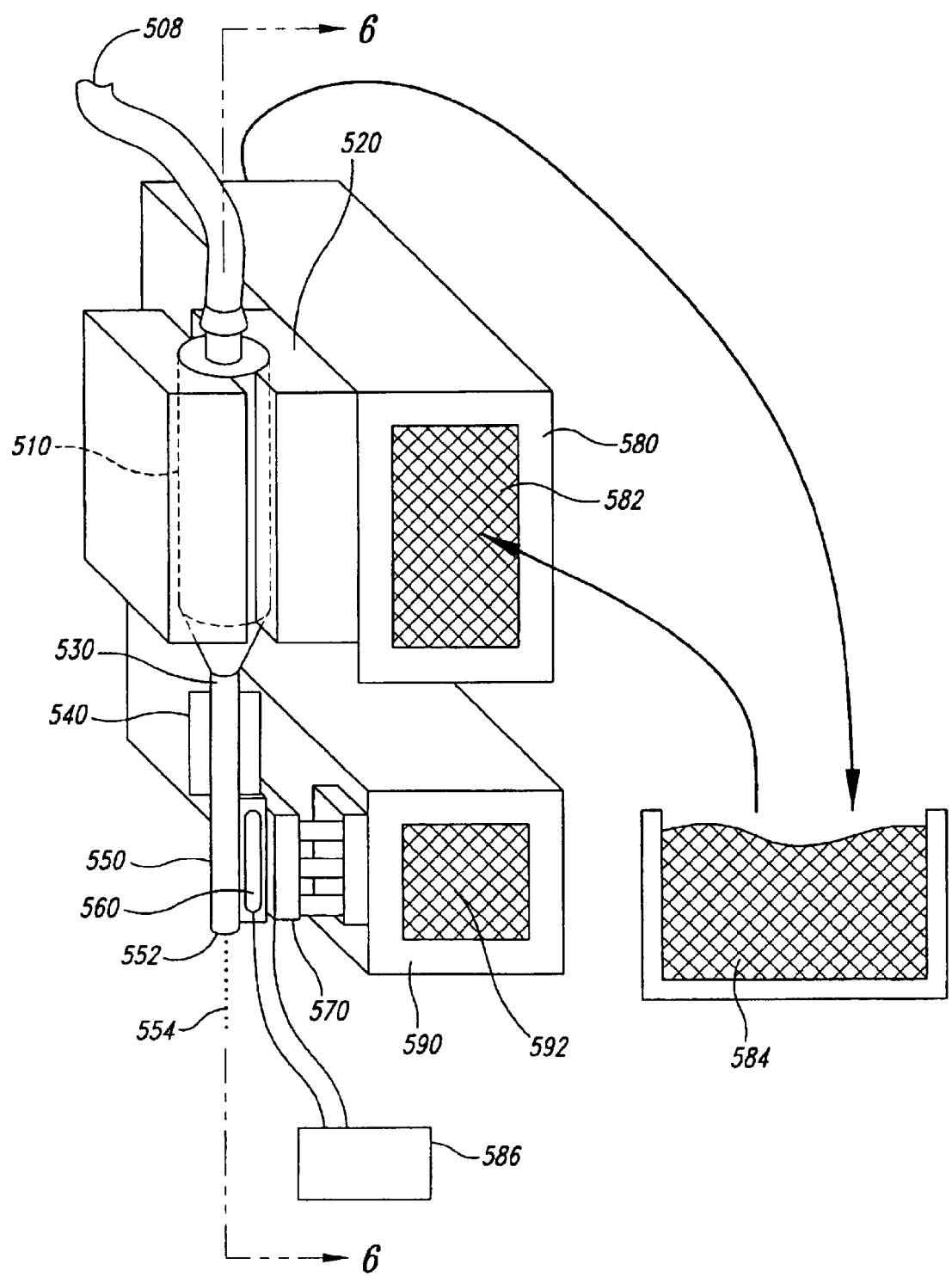
FIG. 5 is an isometric view illustrating one embodiment of the present system in accordance with principles of the present invention.

Unless described otherwise below, the construction and operation of the printhead, mounting means, and apparatus for supporting the printhead device as shown in FIG. 5 are of conventional design for the various applicable technologies. As a result, all variations and structures need not be described in further detail herein, as they will be understood by those skilled in the relevant art. Such description is omitted for purposes of brevity and so as not to obscure the detailed description of the invention. Any modification necessary to the printing apparatus, mounting brackets, or valve design of the overall dispensing apparatus and system in FIG. 5 can be readily made by one skilled in the relevant art based on the detailed description provided herein.

FIG. 5 is an isometric illustration of one embodiment of a hardware implementation of the heat flow diagram of FIG. 4. The fluid is dispensed by means of microvalve 510, through which fluid flows, entering through supply tube 508 and dispensing through microvalve discharge end 530. A pressure source or reservoir (not shown) typically drives this flow. The microvalve 510 is mounted in mounting hardware 520, which may be made of a thermally conductive material such as copper. The mounting hardware 520 in turn is thermally connected to heat sink conduit 580. The heat sink conduit 580 may have its temperature maintained by flowing liquid 582, which may be supplied from a bath 584 maintained at a designated temperature by a control system (not shown). Typically, if the desired temperature of dispensed droplets is approximately ambient (20 C to 25 C), then the temperature to which bath 584 is controlled may be approximately the same. In this embodiment the flowing liquid 582 is shown as being returned to the bath for re-use in a closed circuit. Alternatively, the temperature control and heat sink devices may be non-liquid. Fluid to be dispensed passes through microvalve 510 and microvalve discharge end 530 and then passes through a dispensing structure 550 which may be connected to microvalve discharge end 530 by a sleeve 540.

The dispensing structure 550 in the present embodiment is illustrated as a tube which contains at its most downstream end an orifice 552. The orifice dispenses fluid as a stream or individual drops 554. Alternatively, the dispensing structure 550 and orifice 552 may be of integral construction. In yet another alternative embodiment, the dispensing structure 550 could have a gradually tapering internal cross-section culminating in a minimum cross-section at its downstream end. The exterior of dispensing structure 550 need not be of constant cross-section as shown, but instead could also be tapered, thereby resembling what is commonly thought of as a nozzle. Other geometric variations in order to obtain a desired dispensing pattern are also possible.

In the present embodiment, the dispensing structure 550 is shown as a separate component from microvalve 510. Designing the dispensing structure 550 as a separate component may provide additional advantages including, for example, the ability to interchange or replace parts, perform cleaning operations, and the like. However, it is also possible for components 510, 530, 550, and 552 to be manufactured as an integral component, or for some combination of integral and separate components to be used.

A temperature sensor 560 and a temperature-altering device 570 are attached to the dispensing structure 550. The sensor 560 and temperature-altering device 570 may be thermally coupled to the dispensing structure 550. The temperature sensor 560 may be a thermocouple, thermistor, resistance temperature detector, non-contact temperature-measuring device such as an infrared temperature-measuring device, or other temperature detector as is known in the art. Thermocouples are well suited to localized and time-dependent temperature measurements and can be attached to the dispensing structure or object whose temperature is being measured by soldering or welding or similar methods to provide thermal contact. One advantage of thermistors is that thermistors provide a sizable voltage signal for a given temperature change.

The temperature-altering device 570 is powered by a power supply 586. In one embodiment, the operation of power supply 586 is controlled based on a signal from temperature sensor 560. Control could be performed using turn-on/shut-off at specified setpoints, by Proportional-Integral-Derivative (PID) control, by fuzzy logic, or by other control methods as are known in the art.

The temperature-altering device 570 may be a thermoelectric device. Thermoelectric devices are versatile solid-state electronic devices that move heat by the Peltier effect. Alternatively, the temperature altering device 570 may be a simple heater using Joule (resistive) heating, a coding device or the like. If the temperature-altering device 570 is a thermoelectric device, then the liquid 592 flowing through the second ultimate heat sink 590 will reduce heat from the dispensing structure 550 and will reduce the electrically dissipated heat resulting from operation of the temperature-altering device. This transfer of heat is illustrated in the flow chart of FIG. 4.

Thermoelectric devices are of particular interest in the situation where liquid may be pre-heated to above ambient temperature by passage through a dispenser such as a microvalve while at the same time it is desired that the temperature at which liquid is actually dispensed be back at approximately ambient temperature. Thermoelectric devices are versatile solid-state electronic devices which move heat by the Peltier effect, thus thermoelectric devices can move heat in either direction depending on the electrical polarity applied to them. These devices are frequently used in the mode of refrigerating or removing heat from a region of interest, and they can be adequately sized to allow appropriate control of the temperature of a small part such as the dispensing structure of a microvalve.

When thermoelectric devices are used in the mode of removing heat from a region of interest, they are often coupled with an ultimate heat sink such as the second ultimate heat sink 590 that may contain a second flowing liquid 592. The liquid 592 carries away the heat removed from the region of interest together with whatever additional dissipated heat results from the operation of the device. In the exemplary embodiment, the second ultimate heat sink 590 is shown as being physically distinct from ultimate heat sink 580 so that each can maintain a different temperature as might be preferred. Alternatively, these two heat sinks may be combined.

The second ultimate heat sink 590 removes heat from a temperature-altering device which, in the case of a thermoelectric device, may operate best when some temperature difference is present. Accordingly, it may be desirable that the second ultimate heat sink 590 be of sub-ambient temperature rather than that its own temperature be closely controlled. For example, for the second ultimate heat sink 590, a once-through stream of cold tap water may be sufficient.

The observations and experiments described herein used microvalves supplied by the Lee Company (Essex, Conn.), designated with Lee Company part number INKX0502450A. The microvalve body has external dimensions of a diameter of 0.225 inch (5.72 mm), a length (exclusive of fluid connections) of approximately 0.83 inch and an overall length of approximately 1.25 inch. The signal that actuates the microvalve is a square wave of magnitude 40 Volts and pulse width or pulse duration approximately 200 microseconds, repeated approximately every 1250 microseconds (corresponding to 800 Hz). The inventors appreciate that a variety of commercially available microvalves of varying sizes, signals and pulse sequences may be used in accordance with aspects of the present invention.

Figure 6:
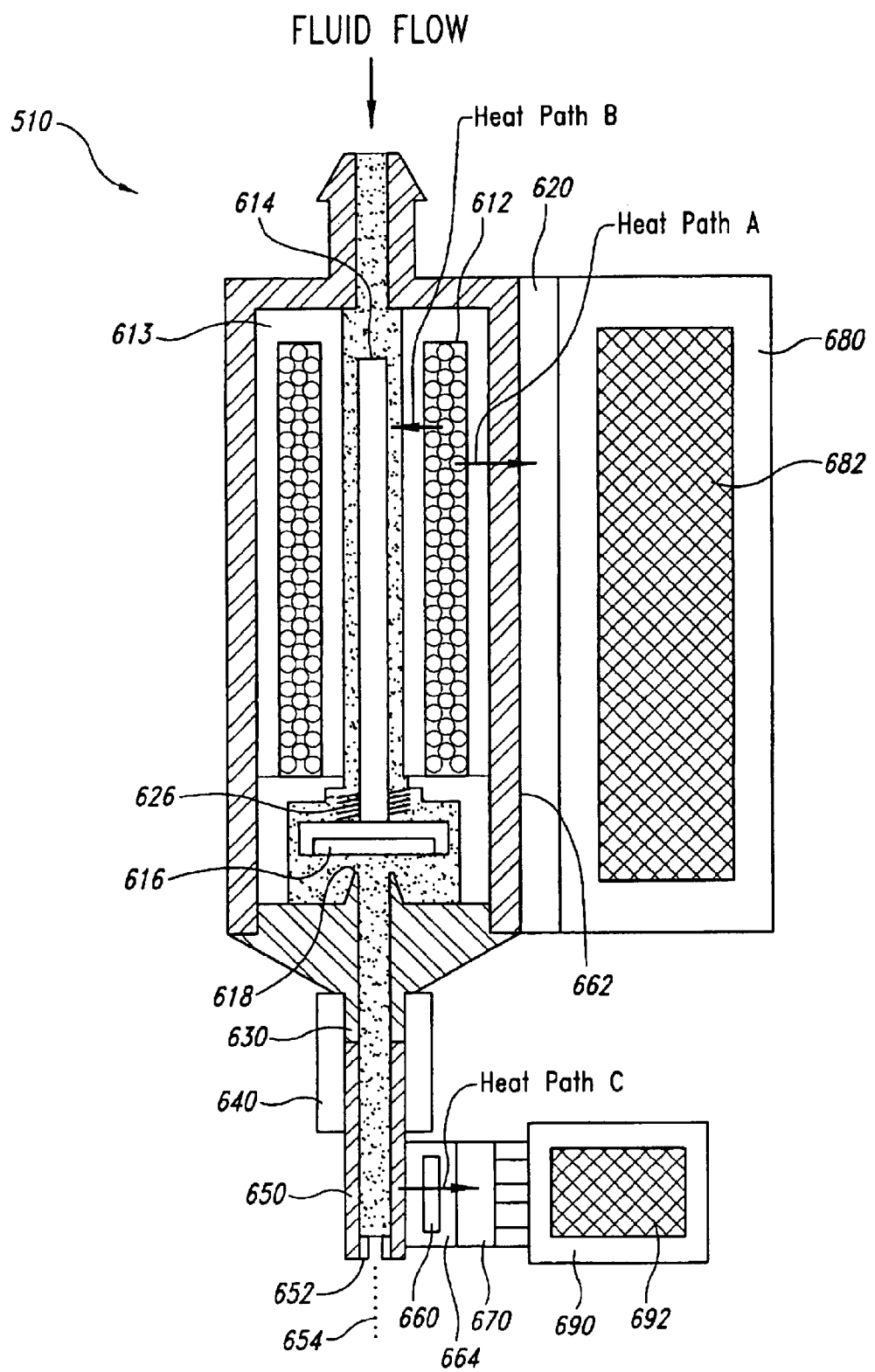
FIG. 6 is an enlarged cross-sectional view along line 6—6 of one embodiment of a dispensing unit of FIG. 5, illustrating a microvalve with a temperature control apparatus in accordance with principles of the present invention.

FIG. 6 illustrates the interior of such a microvalve along cross-section 6—6 of FIG. 5. Inside the microvalve 510 is an electrically powered solenoid 612 that actuates the plunger 614 or similar moving part. Microvalve 510 may include a thermally conductive potting material 613, for example, an epoxy, suitable to conduct heat from the coil to the outside surface of the microvalve body. In the exemplary embodiment, the bottom of the plunger 614 contains a seat 616 made of an elastomeric material, for example, EPDM (ethylene propylene diene) rubber. Abutting against this seal, in the closed position of the valve, is a mating part 618 which also defines the beginning of the valve discharge end 630.

The stroke of the plunger 614 is limited by a stop (not shown) to a stroke distance of several thousandths of an inch. A coil spring 626 may be included to provide a return force.

The fluid leaves the microvalve 510 through microvalve discharge end 630. Attached to the discharge end 630 of the microvalve is a dispensing structure 650. In the exemplary embodiment, the dispensing structure 650 connects to the microvalve 510 with a polymeric coupling sleeve 640. The coupling sleeve in the present embodiment includes an interference fit on both the microvalve discharge end 630 and the dispensing structure 650. Alternatively, the coupling sleeve may be threaded or alternatively affixed to the microvalve discharge end 630 and the dispensing structure 650.

The orifice 652 in the exemplary embodiment includes a sapphire jewel having a flat surface, with a dispensing hole oriented perpendicular to that flat surface. Typical orifice diameters used were 150 to 190 microns (0.006 inch to 0.0075 inch), due to the high viscosity of the dispensed fluid. The jewel is secured in the dispensing structure 650. The dispensing structure 650 of the present embodiment is a tube made of stainless steel, which provides a thermal conductance of heat to the dispensing structure temperature control device 670. The dispensing structure tube of the present embodiment has an inside diameter that closely matches the outside diameter of the jewel. The outside diameter of the dispensing structure 650 shown is 0.050 inch (1.25 mm). The term microvalve should be understood to also include small solenoid-operated valves from other manufacturers, including valves such as are used in automotive fuel injectors.

The fluid used for all data reported herein is a solution of 80 weight percent propylene glycol, and 20 weight percent deionized water. This solution has a nominal viscosity of about 16 cP at ambient temperature and has a viscosity versus temperature relationship having a slope in the region of use of approximately −0.7 cP/° C. This liquid is at the relatively viscous end of the range of typical ink-jet inks, and its viscosity versus temperature slope is steeper than for many inks and dispensed liquids. This slope makes it more difficult to maintain consistency of flow regime because even small shifts in temperature result in significant shifts in viscosity and corresponding changes in flow patterns as discussed previously. Thus, a dispensing apparatus which succeeds in maintaining flow consistency for this relatively difficult fluid is also understood to maintain flow consistency of traditional fluids within even tighter bounds. The surface tension of this liquid is 42 dyne/cm.

In the exemplary embodiment shown in FIG. 6, the microvalve 510 is held in mounting hardware 620 which is made of copper for increased thermal conductivity. The mounting hardware 620 is cooled by a tube 680 containing flowing water 682 from a temperature controlled bath (MGW Lauda, Germany, Model RC6). In the exemplary embodiment, thermocouples 662 are cemented to the surface of the microvalve 510 or mounting hardware 620 to monitor the temperature of the valve body surface. Thermal grease is applied to the valve to increase the heat transfer between the microvalve 510 and the mounting hardware 620. The operating temperature of the valve body surface as measured by a thermocouple was maintained at either 22° C.+/−0.3° C. or 25° C.+/−0.3° C.

One example of a thermoelectric device 670 to control the temperature of the dispensing structure 650, is a 31-couple, 1.8 Amp model from Ferrotec America Corp. (Nashua, N.H.), with dimensions of 7.98 mm×7.98 mm×1.77 mm. The specifications are $I\text{max}$ = Maximum or optimum input current, = 1.8 Amperes $Q\text{max}$ = Maximum heat pumping capacity in watts at zero delta$T$,

= 7.1 W $V\text{max}$ = Nomial maximum DC input voltage at $I\text{max}$ and $DT\text{max}$

= 30° C.,

= 4.3 V $DT\text{max}$ = Nominal maximum temperature differential at zero heat load,

= 70° C.

One example of a controller is from Oven Industries Inc. (Mechanicsburg, Pa.) allowing for active control of the thermoelectric device via a software interface. The controller is capable of controlling to temperatures of −20° C. to 100° C. with a resolution of 0.05° C. One example of a temperature sensor 660 that may be used is a thermistor.

The thermoelectric device 670 is connected to an ultimate heat sink in the form of a copper tube 690, carrying cold tap water 692, as shown in FIG. 6. In this embodiment a piece of copper foil 664 is soldered to the thermoelectric device 670 to act as the holder for the dispensing structure 650 and the thermistor 660. The copper foil 664 transfers heat between the dispensing structure 650, the thermistor 660 and the thermoelectric device 670.

The inventors appreciate that a variety of commercially available thermoelectric devices, controllers, and heat sinks may be used in accordance with aspects of the present invention.

In accordance with aspects of the present invention, improved performance of fluid dispensing is obtained. The temperature of the valve body is maintained to within +/−0.3 C of its setpoint as measured by thermocouple 662 mounted in close thermal contact with the exterior of microvalve 510. As previously illustrated, temperature control of the valve body alone is not sufficient to achieve the desired flow stability. Thus, in accordance with aspects of the present invention, in addition to maintaining a constant temperature of the valve body, additional temperature stabilization is performed by the temperature-altering device 670. The temperature-altering device 670 in the illustrative embodiment maintains the temperature of the dispensing structure 650 within +/−0.1° C. of its setpoint.

Precise maintenance of a constant temperature at the dispensing structure 650 results in a stable fluid stream for substantial periods of time, such as hours. According to aspects of the current invention, a desirable stream appearance, shown for example in FIG. 2E, could be achieved through appropriate initial adjustment of operating parameters and could then be maintained for hours without shifting to one of the undesirable flow regimes. The close control over the liquid temperature at the dispensing structure thus provides improved droplet stream stability and consistency. Droplet stream characteristics, including consistency, repeatability, and precision, are controlled in accordance with aspects of the present invention in part by controlling the temperature at the dispensing structure of the system.

The quality of dispensing resulting from the present invention is further described in Table 1. Consistency of operation is illustrated in this Table in the form of flowrate data measured repeatedly during a run. Flowrate was measured by collecting fluid from a known number of commanded dispensings and weighing it with a precision scale, so it is an average over the known number of drops. The droplet volumes and diameters are calculated from the measured flowrate. The relative standard deviation (standard deviation divided by the mean) of flowrate is a statistical summary of many such measurements taken during an extended run. It is given in the last column of the table and the smallest value, obtained at the coolest setpoint temperature, is approximately 4%.

TABLE 1

|  | Avg. Droplet Vol., nL | St. Dev. nL | Avg. Droplet Diameter $\mu$m | St. Dev. $\mu$m | Avg. Flow Rate, g/min | St. Dev. g/min | Relative Std Dev. |
|---|---|---|---|---|---|---|---|
| 190.5 $\mu$m orifice Valve Temp 25° C. Avg. Nozzle Temp 21.6° C. 190.5 $\mu$m orifice | 12.34 | 2.20 | 285.8 | 17.18 | 0.59 | 0.11 | 0.19 |

TABLE 1-continued

| | Avg. Droplet Vol., nL | St. Dev. nL | Avg. Droplet Diameter μm | St. Dev. μm | Avg. Flow Rate, g/min | St. Dev. g/min | Relative Std Dev. |
|---|---|---|---|---|---|---|---|
| Valve Temp 22° C. Avg. Nozzle Temp 13.7° C. 152.4 μm orifice | 15.49 | 0.64 | 309.2 | 4.26 | 0.74 | 0.03 | 0.04 |
| Valve Temp 22° C. Avg. Nozzle Temp 19.2° C. | 11.11 | 1.05 | 276.7 | 8.78 | 0.53 | 0.05 | 0.09 |

In FIGS. 4, 5 and 6, it is shown that two separate components (liquid-cooled conduits 480 and 490, 580 and 590, or 680 and 690) could serve as the ultimate heat sinks, respectively for the microvalve body and for the thermoelectric device regulating the dispensing structure temperature. In some situations, it might be possible to combine the two individual heat sinks into one. While the ultimate heat sink has been described as a flowing temperature-controlled liquid, that is not the only possible destination for the heat. It would also be possible for the heat to be transferred to a gas by either natural or forced convection, to a phase change substance, to a chemical reaction, to a massive nearby solid component, or to other such destination as is known in the relevant heat sink art.

In this example, the temperature-altering device 670 such as a thermoelectric device has been described as removing heat from dispensing structure 650. Alternatively, thermoelectric devices can be operated in the opposite polarity such that they deliver heat to dispensing structure 650. In yet another embodiment, thermoelectric device 670 can be operated to remove heat from dispensing structure 650 at certain times and supply heat to the dispensing structure 650 at other times. This might be the case if the temperature of fluid entering the dispensing structure 650 was already very close to the setpoint temperature for the dispensing structure 650.

Figure 7:
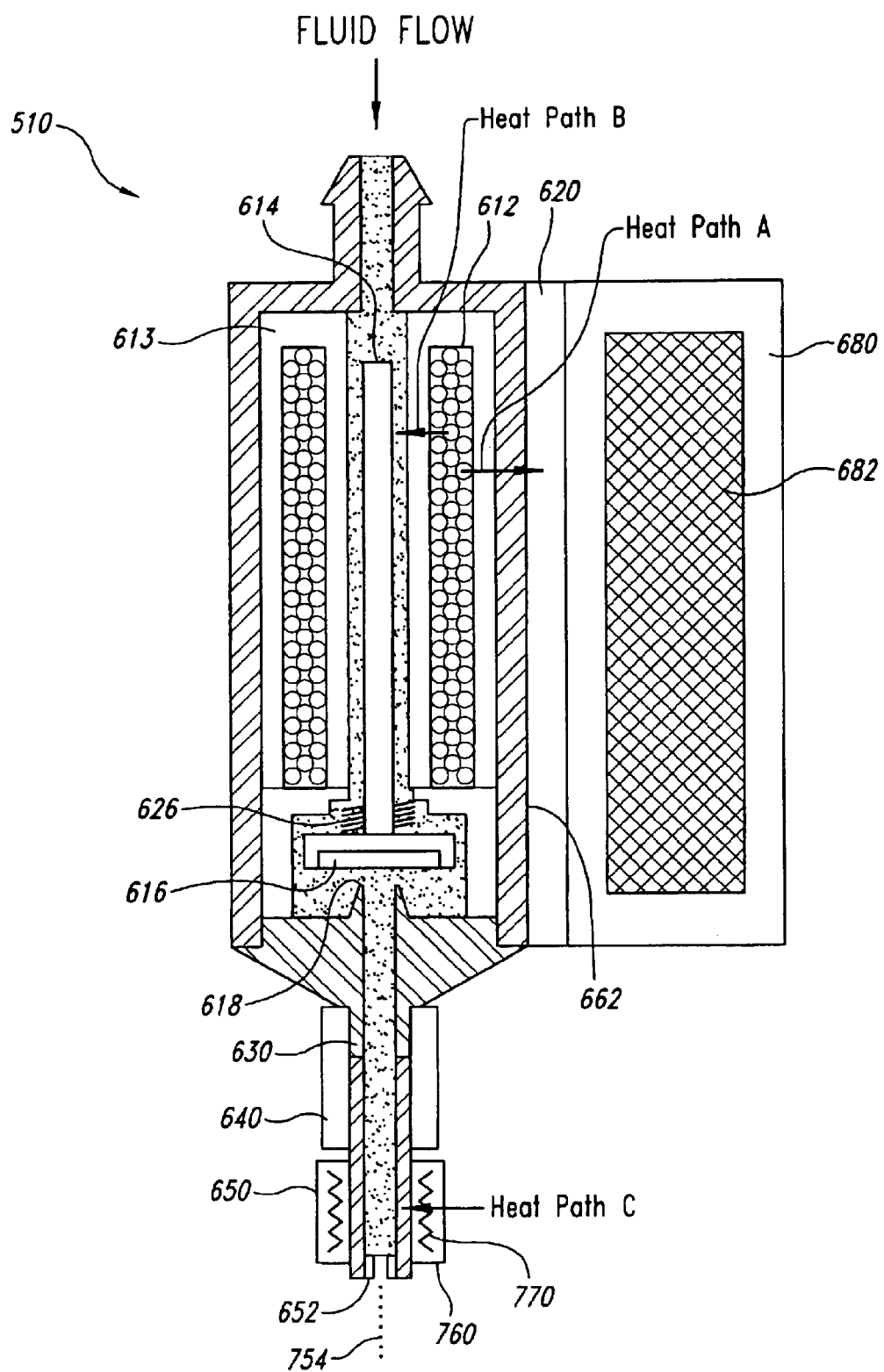
FIG. 7 is an enlarged cross-sectional view along line 6—6 of one embodiment of a dispensing unit of FIG. 5, illustrating a microvalve equipped with a heater at the top of the dispensing structure in accordance with principles of the present invention.

FIG. 7 illustrates yet another embodiment of the present invention. In this embodiment, the temperature-altering device 770 positioned at the dispensing structure 650 is a simple heater using Joule (resistive) heating. The heater could be made of high-resistance metal wire such as NiChrome, or could be metal film deposited on plastic, etc. An ultimate heat sink is not connected to the temperature-altering device 770 in the configuration of the present embodiment. The discharged liquid 754 in the present embodiment is above ambient or above the temperature at which liquid entered the microvalve 510.

The configuration of the present embodiment allows the temperature of the liquid inside the dispensing structure 650 to be increased by heater 770. The liquid therefore would be dispensed at a temperature higher than or equal to the temperature of the liquid leaving the microvalve discharge end 630. The heater 770 at the dispensing structure and its associated control system would maintain the chosen value of the temperature of the dispensed liquid very close to constant despite variations in thermal conditions of the valve, ambient conditions, and the like.

Control of the temperature of the dispensed liquid allows control of the dispensing properties of the liquid, for example, to maintain constant conditions of stream mode and fluid properties, even if these were at somewhat above ambient temperature. Control of the temperature of the discharged fluid is achieved in various ways. Control could be performed in response to a temperature sensor 760 in thermal contact with dispensing structure 650. Control could be performed using turn-on/shut-off at specified setpoints, or by Proportional-Integral-Derivative (PID) control, or by fuzzy logic, or by other methods as are known in the art. Heater power could be adjusted by adjustment of the duty ratio also known as pulse width modulation of a supplied waveform. Heater power could also be adjusted by adjustment of voltage or current supplied to the heater, either without using or with using adjustment of the duty ratio.

In FIG. 7, the dispensing structure 650 and the heater 770 have been shown as separate structures. However, they could be one and the same structure such as if the dispensing structure 650 is an electrical conductor having a resistance, and current is passed directly through dispensing structure 650 so as to dissipate heat by Joule resistive heating. With an electrical heater, regardless of whether it is integral with the dispensing structure, it might be possible to employ the resistance-temperature relationship of the heater to infer a temperature from its measured electrical resistance, thereby making it unnecessary to have a separate dispensing structure temperature sensor.

Figure 8:
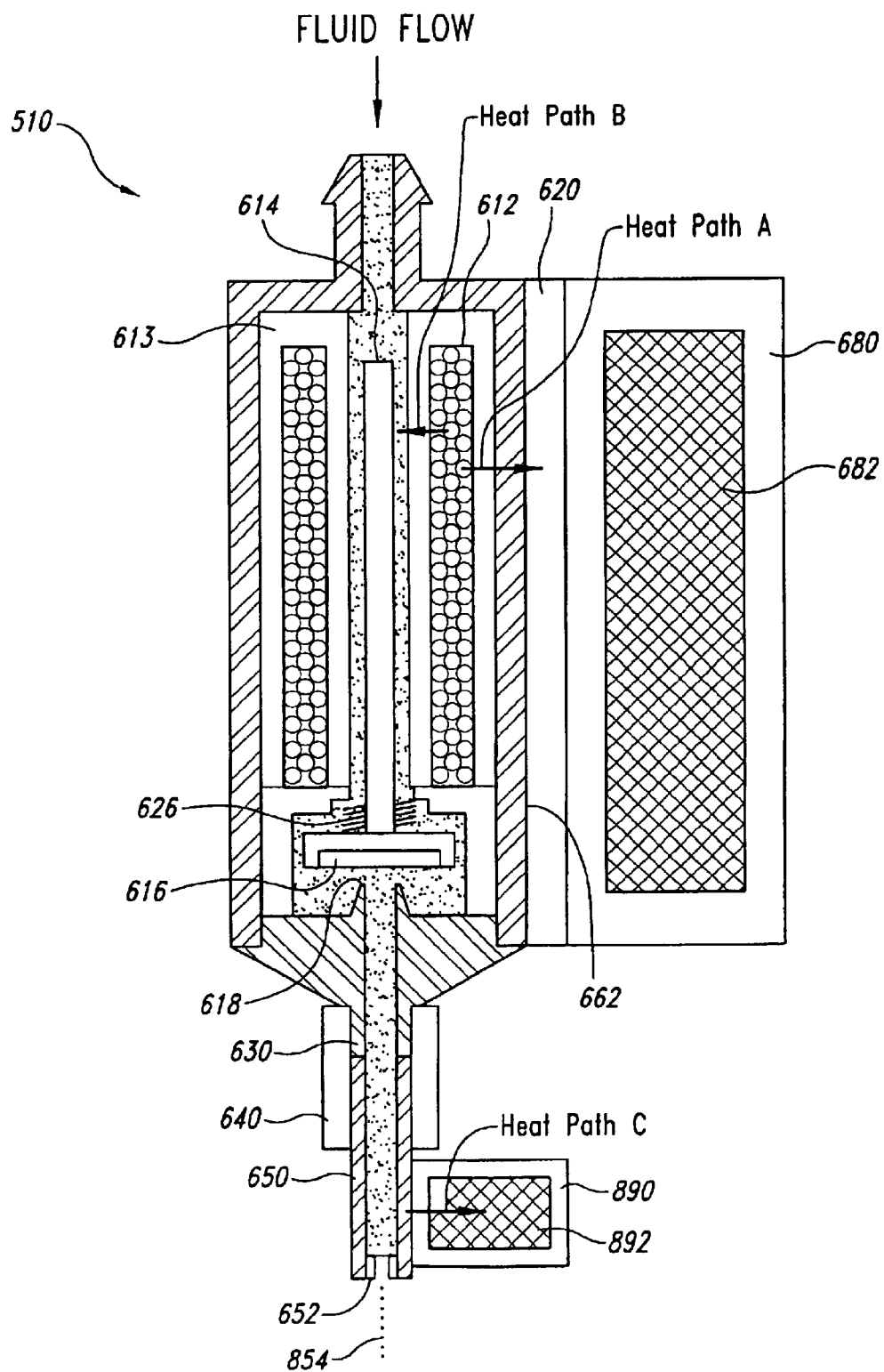
FIG. 8 illustrates yet another embodiment of the microvalve wherein the dispensing temperature is controlled by thermal contact directly with a heat sink in accordance with principles of the present invention.

Yet another embodiment of the present invention is illustrated in FIG. 8. The dispensing structure 650 is thermally coupled directly to a temperature reference. In this case there would be no temperature-altering device, and dispensing structure 650 could simply be in thermal contact with ultimate heat sink 890 which may contain flowing liquid 892 whose temperature may be actively controlled as a dispensed liquid 854. Flowing liquid 892 may be chilled water, for example. In this case the temperature control of the dispensing structure is not active control with the sensitivity available from previous embodiments of the system, however, temperature control at the dispensing structure still affords improvement over the prior art where no temperature control is applied at any location downstream of the dispenser.

In the previous embodiments, the dispenser comprised a solenoid-operated valve (microvalve), but that is not the only type of dispenser that the present invention could be applied to. Another type of dispenser or printhead to which the present invention could be applied is a piezoelectric dispenser.

Figure 9:
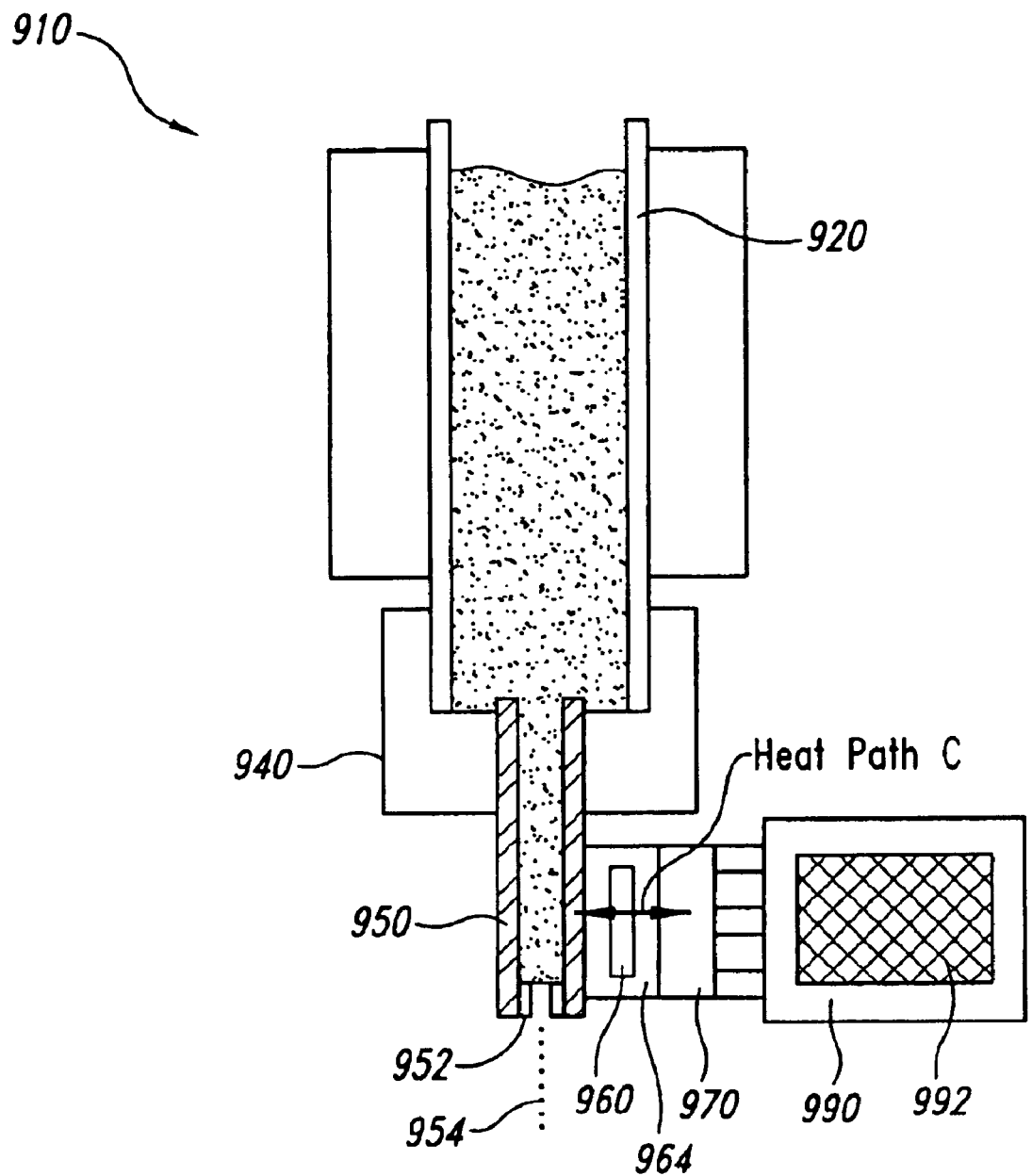
FIG. 9 illustrates yet another embodiment of the dispensing unit, showing a cylindrical squeeze piezoelectric dispenser with a temperature-controlled dispensing structure in accordance with principles of the present invention.

A piezoelectric dispenser 910 can employ a cylindrically symmetric piezoelectric element which changes its radial dimensions so as to squeeze a cylindrical volume of fluid to eject a drop, as illustrated in FIG. 9 and as is known in the art (e.g., MicroFab, Plano Tex.). In this illustration the piezoelectric element is a cylindrically symmetric hollow device containing a fluid-carrying conduit 920. Upon application of a suitable electrical signal the piezoelectric element changes its dimension radially and upon radial contraction squeezes the fluid conduit so as to eject a drop of liquid. Temperature control could similarly be applied to the dispensing structure of such a dispenser, with resulting improvement in consistency of dispensing.

The piezoelectric dispenser 910 includes a conduit 920 containing fluid, a dispensing structure 950 secured to the conduit 920 by bracket 940. An orifice 952 is shown as a separate element at the dispensing end of the dispensing structure 950, but may be integral to the dispensing structure. Dispensed liquid 954 is dispensed through the orifice 952. A temperature sensor 960 and a temperature-altering device 970 are attached or thermally coupled to the dispensing structure 950 as described with respect to FIG. 5. When the temperature-altering device 970 is a thermoelectric device as shown in the exemplary embodiment, the thermoelectric device 970 is connected to an ultimate heat sink in the form of a copper tube 990, carrying fluid 992. In this embodiment, a piece of copper foil 964 is soldered to the thermoelectric device 970 to act as a holder for the dispensing structure 950 and the temperature sensor 960. The copper foil or similar element transfers heat between the dispensing structure 950, the temperature sensor 960 and the thermoelectric device 970.

Figure 10:
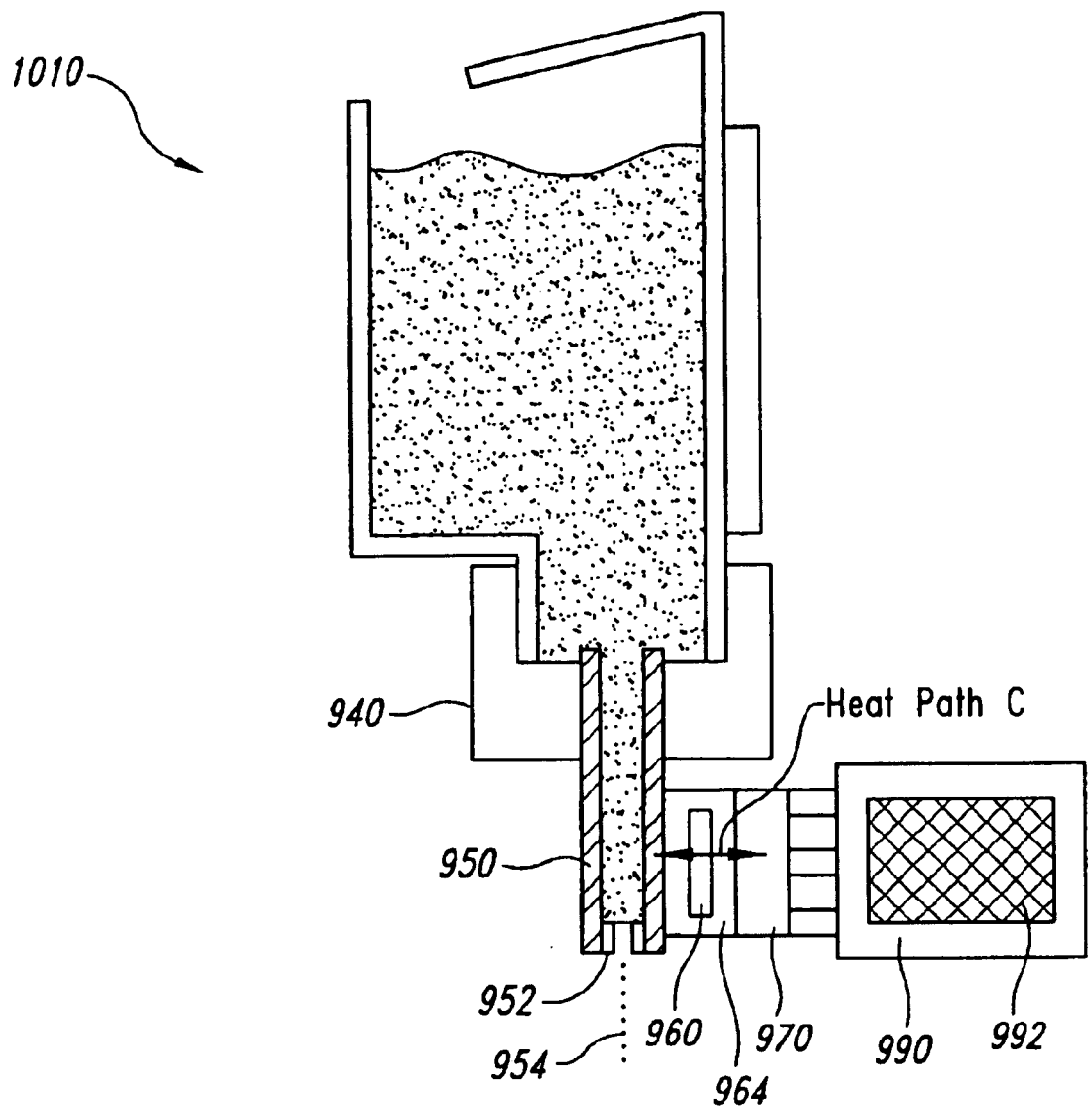
FIG. 10 illustrates yet another embodiment of the dispensing unit, showing a bending volume displacement piezoelectric dispenser with a temperature-controlled dispensing structure in accordance with principles of the present invention.

Another type of piezoelectric dispenser 1010 uses a piezoelectric element which bends and presses on a diaphragm which is part of the boundary of a liquid volume and in so doing causes ejection of a drop of liquid, as is known in the art. This is illustrated in FIG. 10. As in the previous embodiments, temperature control could be applied to the dispensing structure of such a dispenser, with resulting improvement in consistency of dispensing.

Figure 11:
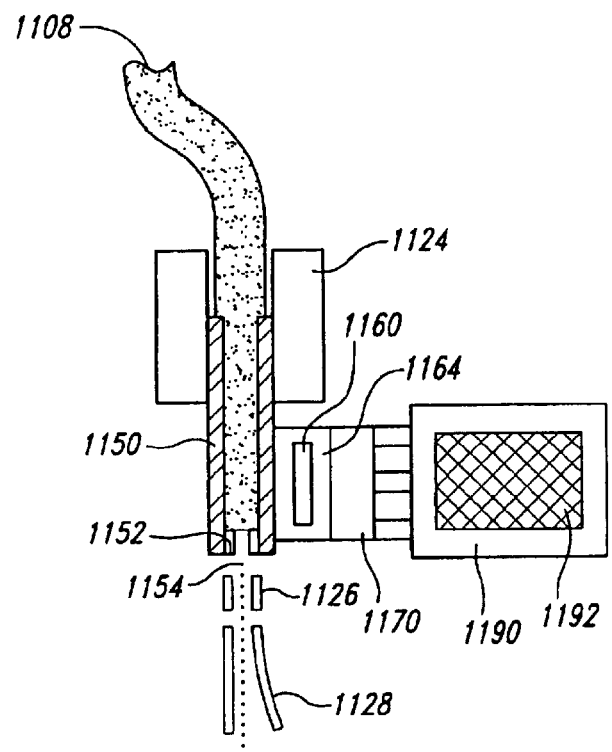
FIG. 11 illustrates yet another embodiment of the dispensing unit, showing a continuous-jet printhead using temperature control according to principles of the present invention.
Figure 12:
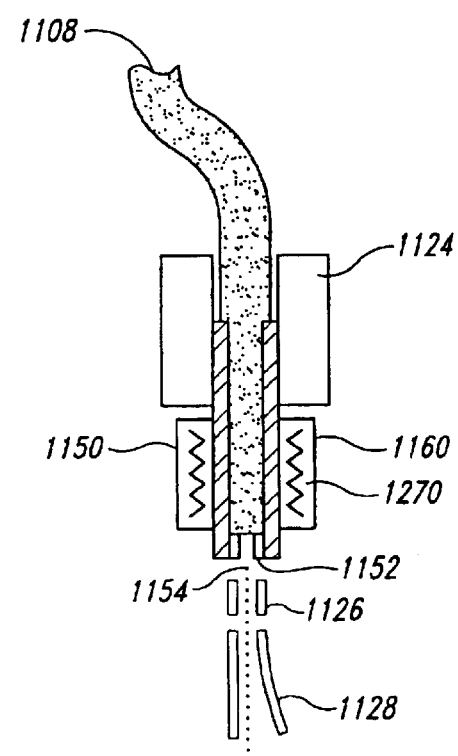
FIG. 12 illustrates yet another embodiment of the dispensing unit, showing a continuous-jet printhead equipped with a heater according to the principles of the present invention.

In yet another embodiment, aspects of the present invention may be applied is a continuous jet printhead such as is illustrated in FIGS. 11 and 12. Such a printhead my include electrostatic charge and deflection. In such a printhead, the liquid is discharged through an orifice 1152 in a continuous stream which breaks up into individual droplets. The stream may breakup as a result of stimulation by a piezoelectric excitation device 1124. Individual drops may be electrostatically charged as they pass through charging cell 1126 and then they pass through the region of deflection plates 1128 wherein they are either deflected or not deflected depending on their charge. The temperature control techniques of the present invention can be applied to the dispensing structure 1150 as discussed previously herein. This is expected to improve the consistency of drop formation and performance of a continuous-jet printhead. FIG. 11 illustrates temperature control of the dispensing structure 1150 using a thermoelectric device 1170 and heat sink 1190, 1192. FIG. 12 illustrates temperature control of the dispensing structure 1150 using a heater 1270.

The results of all these experiments and embodiments illustrate that precise temperature control of the temperature of the dispensing structure maintains more uniform liquid properties and drop formation conditions at the dispensing structure, such as an orifice or nozzle, than would otherwise be possible. In applications such as have been described herein, temperature control at that specific location would not be required simply for maintaining the flowability of the substance being dispensed, as is the case for hot-melt dispensers, but such temperature control provides consistency and controllable quality of dispensing or printing. The temperature control used in the present invention is more localized and more downstream than any control which has previously been used during dispensing of liquid. It has not previously been realized how significant an influence there was due to heat added by the dispenser itself or by other random causes, and it has not been realized that printing performance even at approximately ambient temperature could be improved significantly as a result of such extremely localized temperature control.

In any of the embodiments, the temperature sensor in any of the temperature monitoring locations could be a thermistor, a thermocouple, a resistance temperature detector, a non-contact temperature detector such as an infrared detector (Mikron Inc., Oakland, N.J.) or any other appropriate type of temperature sensor as is known in the art, preferably one well suited to measuring the localized temperature of small objects. In the case of the heater, the electrical resistance of the heater itself may be useful as an indicator of temperature.

The term liquid should be understood to include any state of matter which is generally liquid, including liquids which carry solid particles in the form of a suspension, a slurry, etc., and which may further include steric hindrants or suspending agents, as are known in the relevant art, to help maintain that condition. The term liquid can also include liquids such as hot-melt inks, waxes and solder which are not liquid at room temperature but which are maintained liquid through the application of heat. The liquid may comprise dissolved substances. Any of the dissolved substances or solid particles contained in or carried by the liquid may include Active Pharmaceutical Ingredients.

The term dispensing structure can refer, as already described, to a straight tube or to a design with varying generally tapered areas either internal or external. It also can refer to an orifice in a flat plate, which is a geometry found in some piezoelectric dispensers and other kinds of dispensers.

The term dispenser refers to an apparatus for dispensing small quantities of liquid including microvalves, piezoelectric dispensers, continuous-jet printheads, boiling (bubble-jet) dispensers, and others. The invention could in general be applied to any valve, dispenser, or printhead which affects the temperature and properties of the fluid flowing through the dispenser.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The various embodiments described above can be combined to provide further embodiments. All of the patents and references referred to herein are incorporated by reference. Aspects of the invention can be modified, if necessary, to employ the process, apparatuses, and concepts of the various patents and applications described above to provide yet further embodiments of the invention. These and other changes can be made to the invention in light of the above detailed description. In general, in the following claims, the terms used should not be construed to limit the invention to the specific embodiments disclosed in the specification and the claims, but should be construed to include all temperature control systems and devices that operate under the claims. Accordingly, the invention is not limited by the disclosure, but instead the scope of the invention is to be determined entirely by the following claims.

What is claimed is:

1. A system for controlling the temperature of a dispensed liquid at the point of dispensing comprising:
   a dispenser wherein the dispenser is a microvalve;
   a first heat sink thermally connected to the dispenser;
   a dispensing structure downstream of the dispenser; and
   a temperature-alter device thermally coupled to the dispensing structure wherein the temperature-altering device controls a temperature of the dispensing structure at the point of dispensing of the liquid.

2. The system of claim 1 wherein the dispenser and the dispensing structure are integral components.

3. The system of claim 1 wherein the temperature-altering device is a thermoelectric device.

4. The system of claim 3 further including a second heat sink thermally connected to the thermoelectric device.

5. The system of claim 4 wherein the second heat sink includes a temperature-controlled liquid flowing therethrough.

6. The system of claim 4 wherein the first heat sink and the second heat sink are connected.

7. The system of claim 4 wherein the thermoelectric device removes heat from the dispensing structure.

8. A system for controlling the temperature of a dispensed liquid at the point of dispensing comprising:
- a dispenser;
- a first heat sink thermally connected to the dispenser;
- a dispensing structure downstream of the dispenser; and
- a temperature-alter device thermally coupled to the dispensing structure wherein the temperature-altering device is a resistive heater and controls a temperature of the dispensing structure at the point of dispensing of the liquid.

9. A system for controlling the temperature of a dispensed liquid at the point of dispensing comprising:
- a dispenser;
- a first heat sink thermally connected to the dispenser;
- a dispensing structure downstream of the dispenser;
- a temperature-altering device thermally coupled to the dispensing structure wherein the temperature-altering device controls a temperature of the dispensing structure at the point of dispensing of the liquid; and
- a sensor for measuring the temperature of the dispensing structure.

10. The system of claim 9 wherein the dispenser is a piezoelectric device.

11. The system of claim 9 wherein the sensor is selected from the group consisting of a thermocouple, a thermistor, a non-contact temperature-measuring instrument such as an infrared instrument and a resistance temperature detector.

12. The system of claim 9, further comprising a controller wherein the controller modifies a signal to the temperature-altering device according to the temperature measured by the sensor.

13. An apparatus for dispensing a liquid,
- a dispenser:
- a dispensing structure positioned downstream of the dispenser;
- a temperature-altering device in thermal contact with the dispensing structure, wherein the temperature-altering device adjusts a temperature of the dispensing structure and maintains the dispensing structure temperature at a constant value.

14. The apparatus of claim 13 wherein the dispensing structure is integral to the dispenser.

15. The apparatus of claim 13 wherein the temperature-altering device has a temperature and the temperature-altering device temperature is time-varying.

16. The apparatus of claim 15 wherein the temperature-altering device temperature is time-varying depending on the dispensing structure temperature.

17. The apparatus of claim 13 wherein the temperature-altering device adjusts temperature by removing heat from the dispensing structure.

18. The apparatus of claim 13 wherein the temperature-altering device adjusts a temperature of the dispensing structure by supplying heat to the dispensing structure.

19. The apparatus of claim 13 wherein the temperature-altering device adjusts a temperature of the dispensing structure by removing heat from the dispensing structure as needed and supplying heat to the dispensing structure as needed.

20. The apparatus of claim 13 wherein the temperature-altering device is a thermoelectric device.

21. The apparatus of claim 20 further comprising a heat sink in thermal contact with the thermoelectric device.

22. The apparatus of claim 21 wherein the heat sink comprises a temperature-controlled flowing liquid.

23. The apparatus of claim 13 wherein the dispensing structure has an external cross-section which is essentially constant.

24. The apparatus of claim 13 wherein the dispensing structure has an external cross-section that is tapered, being smaller at its downstream end.

25. The apparatus of claim 13 wherein the dispensing structure has an internal cross-section which is essentially constant followed by an orifice.

26. The apparatus of claim 13 wherein the dispensing structure has an internal cross-section that is tapered, being smaller at its downstream end.

27. The apparatus of claim 13 wherein the dispensing structure is essentially a flat plate with an orifice through it.

28. The apparatus of claim 13 wherein the dispenser is a piezoelectric dispenser.

29. The apparatus of claim 28 wherein the piezoelectric dispenser operates by radial displacement of a cylindrically symmetric piezoelectric element having an interior region further including a conduit for containing fluid to be dispensed.

30. The apparatus of claim 28 wherein the piezoelectric dispenser operates by displacement of liquid due to bending of the piezoelectric element.

31. The apparatus of claim 13, further including a liquid dispensed through the dispenser, wherein the liquid comprises solid particles in the form of a suspension or slurry, and wherein the liquid may further include steric hindrants or suspending agents.

32. The apparatus of claim 13, further including a liquid dispensed through the dispenser, wherein the liquid comprises dissolved substances.

33. The apparatus of claim 13, further including a liquid dispensed through the dispenser, the liquid comprises dissolved substances or solid particles or both, and the dissolved substances or solid particles or both comprise one or more Active Pharmaceutical Ingredients.

34. The apparatus of claim 13 wherein the liquid is a liquid at 25 C.

35. The apparatus of claim 13, further including a liquid heated to above 25 C dispensed through the dispenser.

36. The apparatus of claim 13 further including a three-dimensional printing machine.

37. The apparatus of claim 13 further including a printer.

38. An apparatus for dispensing a liquid, comprising
- a dispenser;
- a dispensing structure positioned downstream of the dispenser;
- a temperature-altering device in thermal contact with the dispensing structure, wherein the temperature-altering device adjusts a temperature of the dispensing structure and
- a sensor which senses the dispensing structure temperature.

39. The apparatus of claim 38 wherein the sensor is selected from the group consisting of a thermocouple, a thermistor, a non-contact temperature-measuring instrument such as an infrared instrument, and a resistance temperature detector.

40. The apparatus of claim 38, further comprising a controller connected to the dispensing structure temperature sensor to modify a signal to the temperature-altering device.

41. The apparatus of claim 40 wherein the controller controls the dispensing structure temperature to within a range of +/−1 degrees Celsius.

42. The apparatus of claim 41 wherein the controller controls the dispensing structure temperature to within a range of +/−0.1 degrees Celsius.

43. An apparatus for dispensing a liquid, comprising
   a dispenser;
   a dispensing structure positioned downstream of the dispenser;
   a temperature-altering device in thermal contact with the dispensing structure, wherein the temperature-altering device is an electrical resistive heater and adjusts a temperature of the dispensing structure.

44. The apparatus of claim 43 wherein a temperature of the electrical resistive heater is sensed by measuring its resistance.

45. An apparatus for dispensing a liquid, comprising
   a dispenser wherein the dispenser is a microvalve;
   a dispensing structure positioned downstream of the dispenser; and
   a temperature-altering device in thermal contact with the dispensing structure, wherein the temperature-altering device adjusts a temperature of the dispensing structure.

46. The apparatus of claim 45 wherein the microvalve comprises interior regions which are filled with thermally conducting material.

47. The apparatus of claim 45 further comprising a heat sink in thermal contact with the microvalve.

48. The apparatus of claim 45 wherein the microvalve has a microvalve temperature, and further comprising a microvalve temperature control system suitable to control the microvalve temperature.

49. A printhead comprising:
   an orifice suitable for issuing a continuous stream of liquid wherein the orifice has an orifice temperature;
   a temperature-altering device in thermal contact with the orifice;
   an electrostatic charging cell;
   deflection plates; and
   a sensor for measuring the orifice temperature.

50. Apparatus for dispensing a liquid, comprising
   a dispenser; and
   a dispensing structure positioned downstream of the dispenser, the dispensing structure further including an electrical resistance of the dispensing structure that generates heat upon passage of a current through the dispensing structure wherein the electrical resistance of the dispensing structure is measured to indicate a temperature of the dispensing structure, and wherein heat is generated during dispensing so as to maintain a predetermined liquid temperature.

51. Apparatus for dispensing a liquid, comprising
   a dispenser;
   a nozzle positioned downstream of the dispenser; and
   a heat sink in thermal contact with the nozzle wherein the heat sink includes a flowing liquid having a liquid temperature, wherein the liquid temperature is maintained at a desired value.

52. A method of dispensing liquid, comprising:
   dispensing liquid from an apparatus having a dispenser and a dispensing structure downstream of the dispenser; and
   altering a temperature of the dispensing structure wherein altering the dispensing structure temperature comprises removing heat from the dispensing structure.

53. The method of claim 52 wherein altering the dispensing structure temperature further comprises supplying heat to the dispensing structure.

54. The method of claim 53 wherein altering the dispensing structure temperature is performed by a heater.

55. The method of claim 52 wherein altering the dispensing structure temperature is performed by a thermolectic device.

56. The method of claim 53 wherein altering the dispensing structure temperature is performed by a thermoelectric device.

* * * * *